(12) United States Patent
Strope

(10) Patent No.: US 6,854,207 B1
(45) Date of Patent: Feb. 15, 2005

(54) FISHING LINE SPOOL FOR JUG FISHING

(76) Inventor: Greg Strope, 1715 S 124th E. Ave., Tulsa, OK (US) 74128

( * ) Notice: Subject to any disclaimer, the term of this patent is extended or adjusted under 35 U.S.C. 154(b) by 0 days.

(21) Appl. No.: 10/463,563

(22) Filed: Jun. 17, 2003

(51) Int. Cl.$^7$ .............................................. A01K 89/08
(52) U.S. Cl. .......................... 43/4; 43/43.11; 242/400.1
(58) Field of Search ................. 43/4, 43.11; 242/400.1, 242/402, 405.1, 405.2; 441/81

(56) References Cited

U.S. PATENT DOCUMENTS

| | | | | |
|---|---|---|---|---|
| 2,041,322 A | * | 5/1936 | Cantini | 43/43.11 |
| 2,893,045 A | * | 7/1959 | Dalbec | 15/323 |
| 3,010,238 A | * | 11/1961 | Crumrine et al. | 43/16 |
| 3,037,217 A | * | 6/1962 | Mandra | 441/20 |
| 3,212,795 A | * | 10/1965 | Humphrey et al. | 285/7 |
| 3,714,731 A | * | 2/1973 | Benson | 43/43.11 |
| 4,089,131 A | * | 5/1978 | Phillips | 43/4 |
| 4,542,862 A | * | 9/1985 | Romike et al. | 242/405.1 |
| 4,574,515 A | * | 3/1986 | Garner | 43/43.11 |
| 4,607,449 A | | 8/1986 | Brachear | |
| 4,917,041 A | * | 4/1990 | Weiswurm et al. | 116/210 |
| 5,033,225 A | | 7/1991 | Waldroop et al. | |
| 5,048,219 A | | 9/1991 | Georgescu | |
| 5,188,551 A | * | 2/1993 | Keller | 441/6 |
| 5,207,013 A | * | 5/1993 | Bartok et al. | 43/4 |
| 5,231,952 A | * | 8/1993 | Tenniswood, David M. | 116/210 |
| 5,253,445 A | | 10/1993 | Spoonemore | |
| 5,265,369 A | | 11/1993 | Botkins | |
| 5,613,888 A | | 3/1997 | Lamphere | |
| 5,782,663 A | * | 7/1998 | Van Raden | 441/25 |
| 6,029,391 A | * | 2/2000 | Holley et al. | 43/43.11 |
| 6,092,325 A | | 7/2000 | Walker | |
| 6,401,382 B2 | | 6/2002 | Larkin | |

* cited by examiner

Primary Examiner—Peter M. Poon
Assistant Examiner—David Parsley
(74) Attorney, Agent, or Firm—Molly D. McKay

(57) ABSTRACT

A fishing line spool with different sizes of female threads for removably attaching to a threaded neck of a plastic bottle to create a jug line used for jug fishing. The spool is removed from the bottle for storage. The spool is provided with a line spool area around which fishing line is wrapped to store the line and with a double walled protection flange provided with penetrable material to receive the pointed end of hooks when the fishing line is not in use. A locking pin removably extends through pin openings provided on either side of the spool area to prevent fishing line from unwinding from the thread spool area and as a means of fixing the depth of the fishing line. The locking pin can be removed from the pin openings to allow the fishing line to be wrapped onto or unwrapped from the spool area.

2 Claims, 3 Drawing Sheets

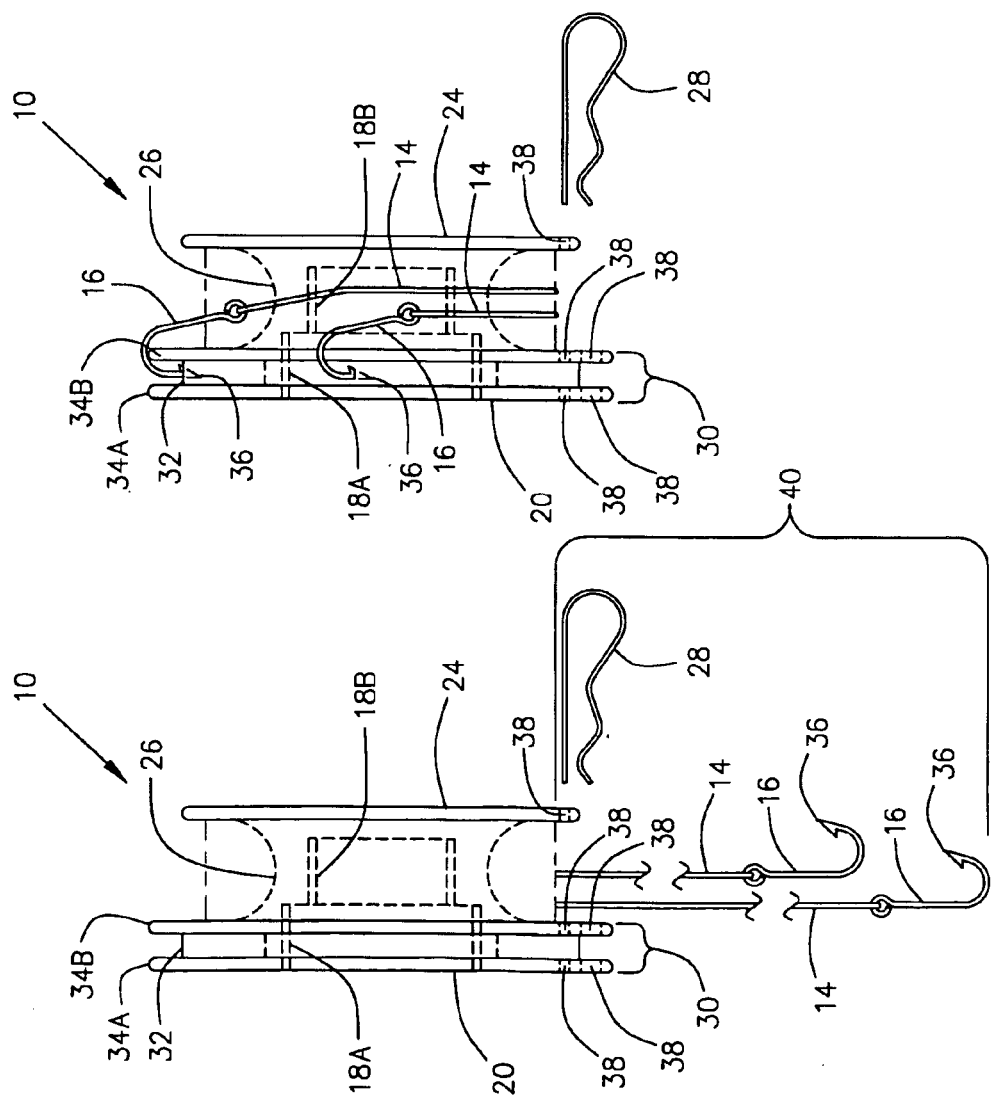

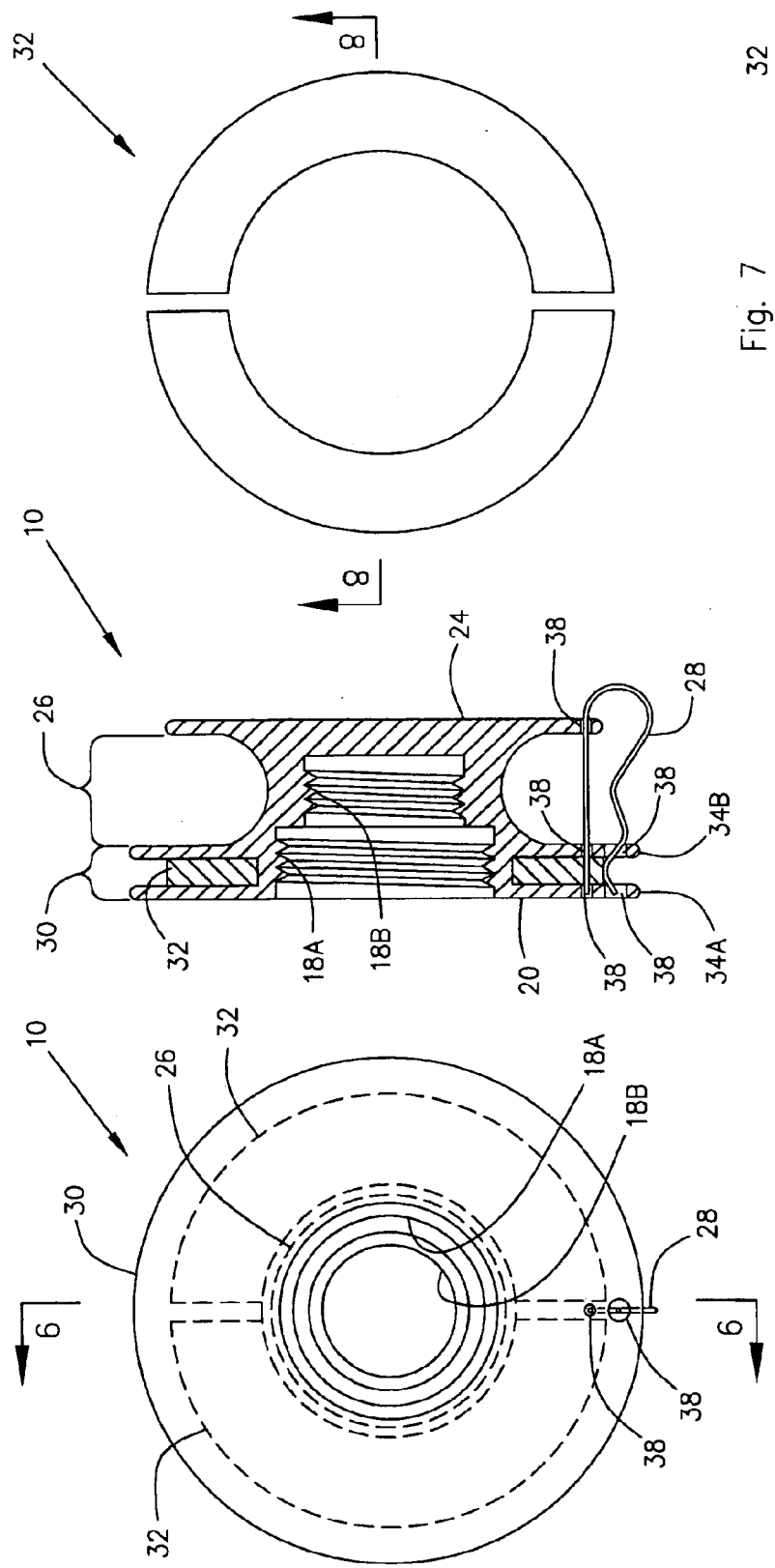

FISHING LINE SPOOL FOR JUG FISHING

BACKGROUND OF THE INVENTION

1. Field of the Invention

The present invention relates to a fishing line spool with space for storing fishing line and attached fishing hooks. The spool can be removably attached to various sizes of plastic bottle so that together the spool and plastic bottle can be used in jug fishing and so that the spool can be removed from the plastic bottle to store the spool, fishing line, and hooks as a separate unit when they are not in use. A locking pin attaches around the fishing line on the spool to prevent the line from unwinding from the spool and as a means of regulating the length of fishing line extending from the spool.

2. Description of the Related Art

Jug line fishing is a popular sport among fisherman. Jug fishing involves using a jug line which consists of a floating device, i.e. usually a plastic bottle or jug, with a weighted line tied to it. One or more fish hooks are attached to the line so that the hooks extends from the neck of the bottle or jug at various spacing or lengths desired by the fisherman or as required by local fishing regulations. The hooks are baited and placed in the water with the jug so that the hooks drift below the jug and catch fish.

Jug lines are generally fished in groups on a body of water and boats are most commonly used to place and monitor the jug lines. The jug lines are baited and released a short distance apart. The jug lines then drift slowly across an area covering much more water than an anchored or stationary trot line arrangement.

Although, if one specific hot spot is very productive, a larger weight can be used at the bottom of the jug line to make it stationary so that the jug line will not drift over the water. Once a fish is hooked on the jug line, the jug will begin to bob erratically in the water. This bobbing action is often referred to as dancing on the water by jug fishermen.

The jug line is then tended by the fisherman, the fish is removed, and the jug line re-baited, and the process is repeated. This is an exciting and productive way to fish in that it offers fun coupled with suspense in that the fisherman never knows if the dancing jug may hold the big fish that every fisherman seeks to catch.

Conventional jug line fishing has some disadvantages. First, storage and transport of conventional jug lines can be a nuisance. Conventional jug lines normally consist of a line wrapped around the small neck or body of the jug, with the hooks inserted into the ball of line that is created around the neck or body of the jug when the line is wrapped around the jug. This arrangement for storing conventional jug lines often leads to a tangled nightmare with dangerous exposed hooks, barbs, and loose line.

Also, if the line is cut or broken from the jug, the entire line has to be retied to the jug. This is often a time consuming task and can be particularly difficult when jug line fishing at night.

Additionally, controlling the depth of the jug line is a problem, particularly when fishing in different depths of water and when fishing in varying fishing conditions. With conventional jug lines, the length of the line on the jug is generally the only depth that you have available. Some fishermen try to knot the line around the jug at the desired depth as a means of regulating the line length or depth, but this technique rarely seems to work and is a temporary solution at best.

Finally, with conventional jug lines, versatility of the jug or bottle size and shape is not an option. Many jug fishermen like to use a variety of shapes and sizes depending on weather and water conditions. However, with conventional jug lines, the shape and size of the jug on which the line is tied is the shape and size available for the fisherman.

The spool of the present invention addresses each of these problems. The present spool is provided with a spool area onto which fishing line wraps easily and neatly. The spool area also allows storage for greater lengths of line than would be possible on a conventional jug line. The fishing line is held on the spool area so that it does not slip off of the jug of a conventional jug line and become tangled.

The spool of the present invention safely holds hooks in the penetrable material that is provided between the double wall of the protective flange when the fishing line is not in use, thus making the hooks more secure and less dangerous to handle. Also, because the penetrable material is provided around the entire spool, the hooks can be inserted into the penetrable material at the necessary locations so that the line is tightly maintained on the spool and will not unwrap or become tangled due to the line being loosely held on the spool.

Because the spool of the present invention is provided with different sizes of female threads on one of its ends, it can be removably attached to any of a variety of sizes and shapes of plastic bottles by simply engaging the male threaded bottle neck into one of the female threads of the spool. This change from one bottle size or shape to another bottle size or shape does not require that the line be cut and retied to the new bottle as is required with conventional jug lines.

The spool of the present invention can be removed from one jug and attached to another jug quickly and easily in a matter of a few seconds by simply unscrewing the spool from the male threaded neck of one jug and screwing it onto the male threaded neck of another jug. The size of jugs employed can range from a small 16 ounce bottle to a jumbo 3 liter bottle, depending on the fisherman's personal preference.

Also, because the spool is detachable from its associated bottle, the spool, with line and hooks attached, can be removed from the bottle for storage in a tackle or storage box until the next time it is needed.

The locking pin of the present invention also allows the fisherman to select the desired length of line that extends from the jug by removing the locking pin from the spool and adjusting the line length. Once the line is adjusted to the desired length, the fisherman can be assured that the length will be maintained by reattaching the locking pin to the spool, thereby preventing the line from unwrapping from the spool. To change the length of the line and thus the depth of the hooks in the water, the fisherman simply removes the locking pin and takes up or lets out line from the spool to the desired length before reinserting the locking pin onto the spool.

The locking pin can also be used to hold the line from unwrapping from the spool when the entire length of the line is wrapped around the spool area in preparation for storage.

Finally, because the spool is so easy to thread onto or off of a bottle, and the line is so easy to wrap around the spool, to adjust in length, and to secure along with the hooks to the spool for storage, all of these operations can be performed by a fisherman at night when there is little or no light by which to see.

SUMMARY OF THE INVENTION

The present invention is a fishing line spool that removably attaches to a plastic bottle. Together the spool and plastic bottle are used to jug fish and the spool can be removed from the plastic bottle to store the fishing line and hooks that are used in jug fishing when they are not in use.

The fishing line spool removably attaches via a first female threaded end provided on the spool to a threaded neck of any one of a variety of sizes of plastic soda pop bottles. The spool is provided on an opposite second end with a line spool area around which fishing line is wrapped to store the line. A double walled protection flange is provided between the line spool area and the first end of the spool. A penetrable material, such as for example cork, is provided between the double walls of the flange to receive the pointed end of hooks when the fishing line is not in use.

A locking pin removably extends through pin openings provided on either side of the spool area to prevent fishing line from unwinding from the thread spool area as a means of fixing the depth of the fishing line and as a means of preventing the line from unwinding and becoming tangled. The locking pin can be removed from the pin openings to allow the fishing line to be wrapped onto or unwrapped from the spool area.

BRIEF DESCRIPTION OF THE DRAWINGS

FIG. 2 is a side view of the fishing line spool of FIG. 1, shown removed from the bottle and shown with the locking pin detached from the spool to adjust the length of the fishing line and hooks.

FIG. 3 is a side view of the fishing line spool of FIG. 2, showing the fishing line fully wrapped onto the spool and with the fishing hooks inserted into the penetrable material provided for this purpose on the spool.

FIG. 4 is the fishing line spool of FIG. 3, showing the locking pin reattached to the spool to prevent the line from unwrapping from the spool.

FIG. 5 is an end view of the fishing line spool of FIG. 4, showing the spool with the line and hooks removed.

FIG. 6 is a cross sectional view taken along line 6—6 of FIG. 5.

FIG. 7 is an end view of the penetrable material of FIG. 5 shown removed from the pool.

FIG. 8 is across sectional view taken along line 8—8 of FIG. 7.

DETAILED DESCRIPTION OF THE PREFERRED EMBODIMENT THE INVENTION

Figure 1:
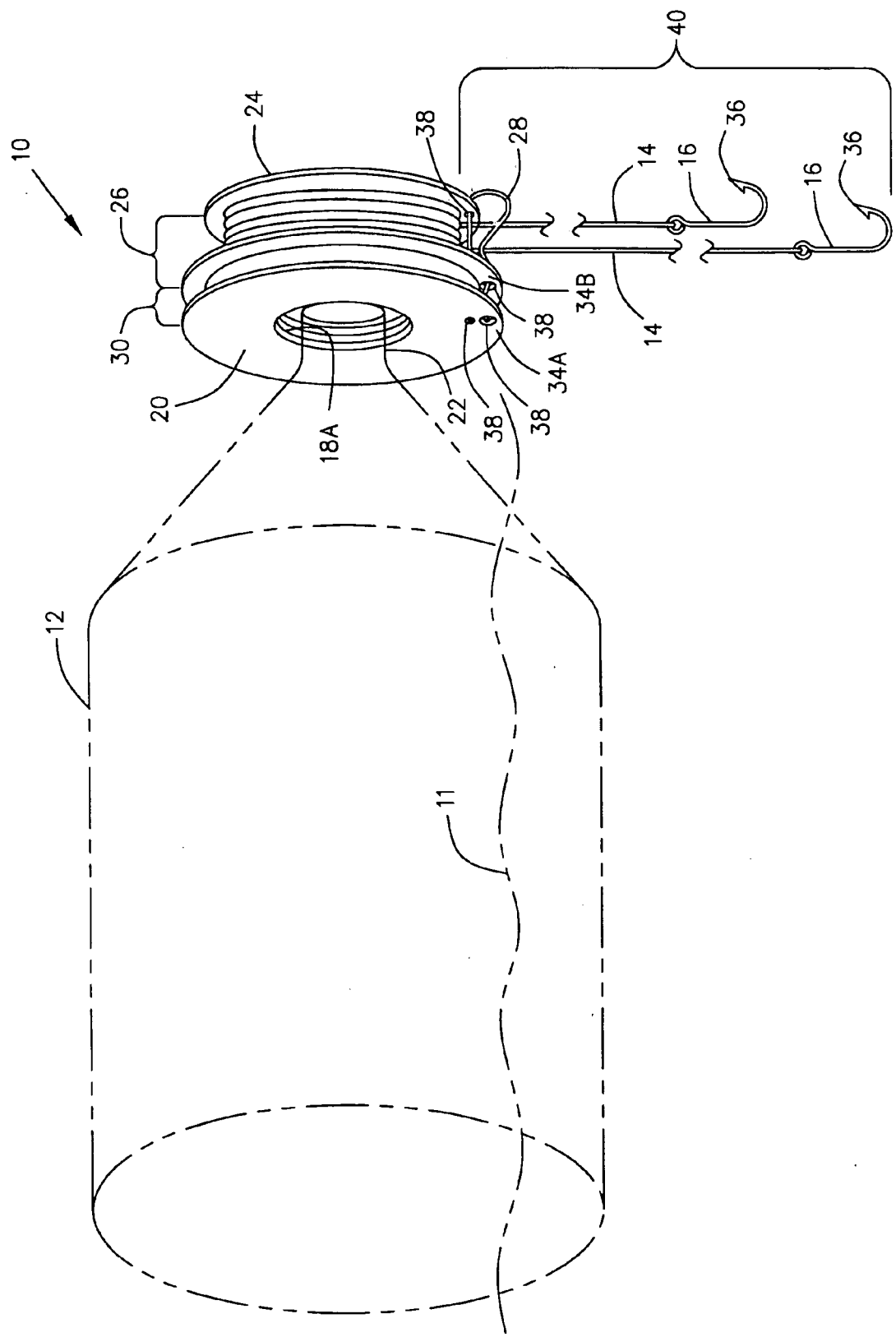
FIG. 1 is a perspective drawing of a fishing line spool for jug fishing that is constructed in accordance with a preferred embodiment of the present invention shown in association with a plastic bottle.

Referring now to the drawings and initially to FIG. 1, there is illustrated a fishing line spool 10 constructed in accordance with a preferred embodiment of the present invention, shown in use in water 11. The spool 10 is illustrated in use with and removably attached to a plastic bottle 12, which is shown in outline in FIG. 1. Together the spool 10 and plastic bottle 12 are used to jug fish, and the spool 10 can be removed from the plastic bottle 12 to store attached fishing line 14 and fishing hooks 16 together with the spool 10 when they are not in use.

As best illustrated in FIGS. 1, 5 and 6, the spool 10 removably attaches via one of several sizes of female threads 18A and 18B provided in a first end 20 on the spool 10 to a male threaded neck 22 of any one of a variety of sizes of plastic soda pop bottles 12 or other similar type of bottle. The spool 10 is provided on an opposite second end 24 with a concave line spool area 26 that encircles the spool 10 and around which fishing line 14 is wrapped to store the line 14, as illustrated in FIGS. 2 and 3 when a locking pin 28 is removed from the spool 10.

As further illustrated in FIGS. 6, 7 and 8, a double walled protection flange 30 is provided between the line spool area 26 and the first end 20 of the spool 10. A penetrable material 32, such as for example cork or a similar substance, is provided around the spool 10 and between the double walls 34A and 34B of the flange to receive the pointed ends 36 of hooks 16 when the fishing line 14 is not in use. As illustrated in FIGS. 7 and 8, the penetrable material 32 may need to be split into two or more segments to fit around the spool and allow space for pin openings 38.

The locking pin 28 removably extends through the pin openings 38 provided on either side of the spool area 26 to prevent fishing line 14 from unwinding from the thread spool area 26 as a means of fixing the length 40 or depth of the fishing line, as illustrated in FIG. 2, and as a means of preventing the line 14 from unwinding and becoming tangled, as illustrated in FIG. 4. The locking pin 28 can be removed from the pin openings 38 to allow the fishing line 14 to be wrapped onto or unwrapped from the spool area 26.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A fishing line spool for jug fishing comprising:
   a first end provided with female threads for removably engaging a male threaded neck of a bottle, an opposite second end provided with a line spool area around which fishing line can be wound, means for removably locking the fishing line so that it does not unwind from the spool area, and
   a penetrable material provided between double walls of a flange located adjacent to the spool area as a means for securing fishing hooks between the first and second ends.

2. A fishing line spool for jug fishing comprising:
   a first end provided with female threads for removably engaging a male threaded neck of a bottle, an opposite second end provided with a line spool area around which fishing line can be wound, and means for removably locking the fishing line so that it does not unwind from the spool area, and
   said first end provided with at least two sets of female threads for removably engaging male threaded necks of different sizes of bottles.

* * * * *